Aug. 2, 1960     J. E. JONES     2,947,630
SUPERSENSITIZATION OF COMPLEX CYANINE DYES
Filed July 29, 1957

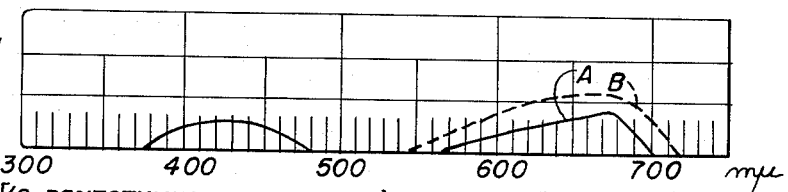

*Fig. 1*

A = 2-[(2-BENZOTHIAZOLYL ETHIODIDE) METHYLENE]-3-β-METHOXYETHYL-5-[(1-METHYL-2(1H)-NAPHTHO[1,2]THIAZOLYL-IDENE)-∝-PHENYLETHYLIDENE]-4-THIAZOLIDINONE

B = A PLUS 5-METHOXY-2-(4-STILBYL)-1,2,3-BENZO-TRIAZOLE-2'-SULFONIC ACID

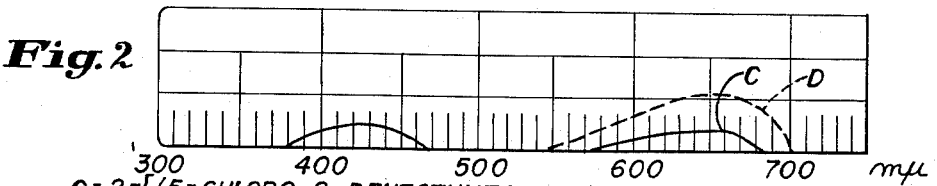

*Fig. 2*

C = 2-[(5-CHLORO-2-BENZOTHIAZOLYL ETHO p-TOLUENESULFONATE) METHYLENE]-3-ETHYL-5-[(3-ETHYL-2(3H)-BENZOTHIAZOLYL-IDENE)-∝-PHENYLETHYLIDENE]-4-THIAZOLIDINONE

D = C PLUS 3,7-BIS(2-PHENYLBENZAMIDO)-2,8-DISULFODIBENZO-THIOPHENE-5,5-DIOXIDE

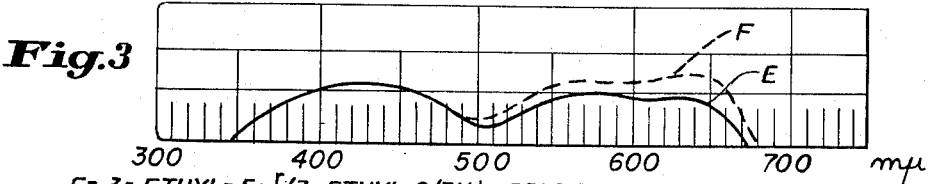

*Fig. 3*

E = 3-ETHYL-5-[(3-ETHYL-2(3H)-BENZOTHIAZOLYLIDENE ETHYLI-DENE]-2-[(2-NAPHTHO[1,2]THIAZOLYL ETHO p-TOLUENESUL-FONATE) METHLENE]-4-THIAZOLIDINONE

F = E PLUS 5-METHOXY-2-(4-STILBYL)-1,2,3-BENZOTRIAZOLE-2'-SULFONIC ACID

Jean E. Jones
INVENTOR.

2,947,630
Patented Aug. 2, 1960

2,947,630

SUPERSENSITIZATION OF COMPLEX CYANINE DYES

Jean E. Jones, Rochester, N.Y., assignor to Eastman Kodak Company, Rochester, N.Y., a corporation of New Jersey Filed July 29, 1957, Ser. No. 674,689

16 Claims. (Cl. 96—104)

This invention relates to photographic emulsions containing complex cyanine dyes, and in supersensitizing combination therewith, certain sulfonated compounds.

It is known in the art of making photographic emulsions that certain dyes of the cyanine class alter the sensitivity of photographic emulsions of the gelatino-silver-halide kind, when the dyes are incorporated in the emulsion. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i.e., increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

I have now found another means of altering the sensitivity in photographic emulsions containing complex cyanine dyes. Since the conditions in the emulsions, i.e., the hydrogen ion and/or a silver ion concentration, undergo little or no change in my method, I shall designate my method as a kind of supersensitization.

It is, therefore, an object of my invention to provide photographic emulsions containing complex cyanine dyes and, in supersensitizing combination therewith, certain sulfonated compounds. Another object is to provide methods for making these emulsions. Other objects will become apparent from a consideration of the following description and examples.

By complex cyanine dyes, I mean a polymethine dye containing 2 cyclammonium nuclei which have basic characteristics and one heterocyclic nucleus derived from a ketomethylene compound having acidic characteristics.

Typical complex cyanine dyes useful in practicing my invention comprise those dyes represented by the following general formula:

(I)
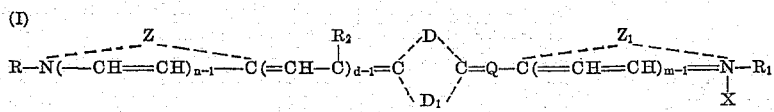

wherein R and $R_1$ each represents an alcohol radical, i.e., an alkyl group (substituted or unsubstituted), such as methyl, ethyl, n-butyl, β-hydroxyethyl, carboxymethyl, β-carbozyethyl, carbomethoxymethyl, carbethoxymethyl, β-methoxyethyl, allyl (i.e. vinylmethyl), benzyl (i.e. phenylmethyl), etc., (especially alkyl groups containing from 1 to 4 carbon atoms), $R_2$ represents a hydrogen atom, an alkyl group (e.g., methyl, ethyl, etc.), or an aryl group (e.g., phenyl, tolyl, etc.), $n$, $m$ and $d$ each represents a positive integer of from 1 to 2, X represents an acid radical, such as chloride, iodide, bromide, perchlorate, p-toluenesulfonate, benzenesulfonate, ethylsulfate, methysulfate, etc., Q represents a nitrogen atom or a methine group (=CH—), D and $D_1$ together represent the non-metallic atoms necessary to complete the 4-thiazolidinone nucleus, 5-thiazolidinone nucleus, or a 4-imidazolidinone nucleus, and Z and $Z_1$ each represents the non-metallic atoms necessary to complete a heterocyclic nucleus containing from 5 to 6 atoms in the heterocyclic ring, such as those selected from the group consisting of those of the thiazole series (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e.g., naphtho[1,2]thiazole, naphtho[2,1]thiazole, 5-methoxynaphtho[2,1]thiazole, 5-ethoxynaphtho[2,1]thiazole, 8-methoxynaphtho[1,2]thiazole, 7-methoxynaphtho[1,2]thiazole, 6,7,8,9-tetrahydronaphtho[2,1]thiazole, etc.), those of the thianaphtheno-7′,6′,4,5-thiazole series (e.g., 4′-methoxythianaphtheno-7′,6′,4,5-thiazole, etc.), those of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole, etc), those of the benzoxazole series (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e.g., naphtho[1,2]oxazole, naphtho-[2,1]oxazole, etc.), those of the selenazole series (e.g., 4-methyselenazole, 4-phenylselenazole, etc.), those of the benzoselenazole series (e.g., benzoselenazole, 5-chlorobenzoselenazole, 5-methoxybenzoselenazole, 5-hydroxybenzoselenazole, tetrahydrobenzoselenazole, etc.), those of the naphthoselenazole series (e.g., naphtho[1,2]selenazole, naphtho[2,1]selenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methylquinoline, 8-methylquinoline, etc.), those of the benzimidazole series (e.g., 1,3-diethylbenzimidazole, 1,3-diethyl-5-chlorobenzimidazole, 1,3-diethyl-5,6-dichlorobenzimidazole, 1-ethyl-3-phenylbenzimidazole, etc.), those of the 3,3-dialkylindolenine series (e.g., 3,3-dimethylindolenine, 3,3,5-trimethylindolenine, 3,3,7-trimethylindolenine, etc.), those of the 2-pyridine series (e.g., pyridine, 5-methylpyridine, etc.), those of the 4-pyridine series (e.g., pyridine, etc.), etc.

Especially useful complex cyanine dyes selected from those represented by Formula I above include the dyes represented by the following two general formulas:

(Ia)

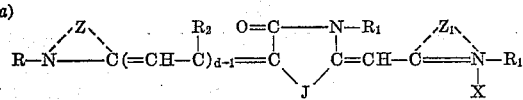

and (Ib)

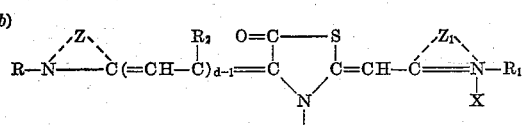

wherein R, $R_1$, $R_2$, $d$, X, Z and $Z_1$ each have the values given above, R' represents an alcohol radical or alkyl group, such as those listed above with respect to R, and J represents a sulfur atom or a

group wherein R" represents an alkyl group, such as methyl, ethyl, etc. (e.g., a lower alkyl group) or an aryl group (e.g., phenyl, tolyl, etc.).

The sulfonated derivatives useful in practicing my invention comprise polycarbocyclic aromatic compounds containing at least one sulfo group. The term "polynuclear aromatic" as used herein is intended to mean 2 or more benzene rings fused together (for example, as in naphthalene, pyrene, etc.) or at least 2 benzene rings or aromatic rings directly joined together (for example, as in diphenyl, terphenyl, quaterphenyl, etc.) or through an aliphatic linkage. Such sulfonated derivatives can conveniently be represented by the following general formula:

(II) $\quad R_3—SO_3M$ wherein $R_3$ represents a polynuclear aromatic group as defined above and M represents a hydrogen atom or a water-soluble cation salt group (e.g. sodium, potassium, ammonium, triethyl ammonium, triethanol ammonium, pyridinium, etc.). Among the most useful of the sulfonated derivatives embraced by Formula II above are the compounds represented by the following general formula:

(III)

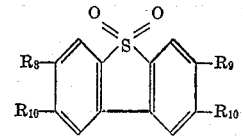

wherein $B_1$ represents a 2-benzotriazolyl group or a 1,3,5-triazin-6-ylamino group, $B_2$ represents an aromatic group (i.e. benzene or substituted benzene) and M has the values given above.

Typical of the sulfonated derivatives of Formula III above, wherein $B_1$ represents a 1,3,5-triazin-6-ylamino group (i.e., a 1,3,5-triazin-2-ylamino group) are the compounds selected from those represented by the following general formula:

(IIIa)

wherein M has the values given above and $R_4$, $R_5$, $R_6$, $R_7$ each represents a hydrogen atom or a substituent group, such as hydroxyl, aryloxyl (e.g., phenoxyl, o-toloxyl, p-sulfophenoxyl, etc.), alkoxyl (e.g., methoxy, ethoxyl, etc.), a halogen atom (e.g., chlorine, bromine, etc.), a heterocyclic radical (e.g., morpholinyl, piperidyl, etc., an alkylthio group (e.g. methylthio, ethylthio, etc.), an arylthio group (e.g., phenylthio, tolylthio, etc.), a heterocyclylthio group (e.g. benzothiazylthio, etc.), an amino group, an alkylamino group (e.g., methylamino, ethylamino, propylamino, dimethylamino, diethylamino, dodecylamino, cyclohexylamino, β-hydroxyethylamino, di-β-hydroxyethylamino, β-sulfoethylamino, etc.), an arylamino group (e.g., anilino, o-, m-, and p-sulfoanilino, o-, m-, and p-chloroanilino, o-, m-, and p-anisylamino, o-, m-, and p-toludino, o-, m-, and p-carboxyanilino, hydroxyanilino, sulfonaphthylamino, o-, m-, and p-aminoanilino, p-acetamidoanilino, etc.), etc.

Compounds of Formula IIIa wherein $R_4$, $R_5$, $R_6$ and/or $R_7$ each represents a heterocyclylamino group (e.g., 2-benzothiazoleamino, 2-pyridylamino, etc.) can also be used in practicing my invention.

Another group of sulfonated derivatives which are useful in practicing my invention are those represented by the following general formula:

(IV)

wherein $R_8$ is an acylamido group (e.g., acetamido, sulfobenzamido, 4-methoxy-3-sulfobenzamido, 2-ethoxybenzamido, 2,4-diethoxy, benzamido, p-tolylamido, 4-methyl-2-methoxybenzamido, 1-naphthylamido, 2-naphthylamido, 2,4-dimethoxybenzamido, 2-phenylbenzamido, 2-thienylbenzamido) or a sulfo group, $R_9$ represents an acylamido group (e.g., as defined by $R_8$ above), or a sulfoaryl group (e.g., sulfophenyl, p'-sulfodiphenyl, etc.) and $R_{10}$ represents a hydrogen atom or a sulfo group, said compound containing at least one sulfo group.

The complex cyanine dyes selected from those represented by Formulas I, Ia and Ib above, have, in general, been previously described in the prior art. Among the references describing the preparation of such dyes are the following:

| Inventor | Patent No. | Issue Date |
|---|---|---|
| Douglas James Fry and John David Kendall. | 2,388,963 | Nov. 13, 1945. |
| John David Kendall | 2,430,295 | Nov. 14, 1947. |
| Oskar Riester and Gustav Wilmanns | 2,440,119 | April 20, 1948. |
| Oskar Riester | 2,442,710 | June 1, 1948. |
| Leslie G. S. Brooker | 2,454,629 | Nov. 23, 1948. |
| Thomas R. Thompson | 2,504,468 | April 18, 1950. |
| Henry G. Derbyshire | 2,535,982 | Dec. 26, 1950. |
| Thomas R. Thompson | 2,535,993 | Dec. 26, 1950. |
| Per Aubert, Roy A. Jeffreys and Edward B. Knott. | 2,656,351 | Oct. 20, 1953. |

Several of the examples below describe the preparation of typical complex cyanine dyes useful in practicing my invention.

Compounds of Formula IIIa which can advantageously be employed in practicing my invention have been described in one or more of the following representative patents:

U.S. 2,171,427, August 29, 1939; 2,473,475; June 14, 1949; 2,595,030, April 29, 1952; 2,660,578, November 24, 1953.

British 595,065, November 26, 1947; 623,849, May 24, 1949; 624,051, May 26, 1949; 624,052, May 26, 1949; 678,291, September 3, 1952; 681,642, October 29, 1952; 705,406, March 10, 1954.

The products of Formula IIIa have been previously employed in the textile field, and are sold under such tradenames as Leucophor B, Calcofluor White MR, Tinopal (SP, WR, BV277, 2B, GS, NG), Blancofor SC, Hiltamine (BSP, N, Sol., 6T6), and the like.

The preparation of a number of compounds employed by Formula IIIa above has been previously described in the copending application Serial No. 540,052 of B. H. Carroll, J. E. Jones and J. Spence, filed October 12, 1955.

The dibenzothiophenedioxide compounds of Formula IV have, in general, been previously described in the prior art. See, for example, U.S. Patents 2,573,652; 2,580,234; and 2,563,493. Further examples of the preparation of such compounds are given in the copending application of J. E. Jones, J. Spence and J. A. Van Allan, Serial No. 575,160, filed March 30, 1956. Other examples of sulfonated derivatives embraced by Formula II above which an advantageously be used in my invention can be prepared according to the methods described in application Serial No. 575,160. Other examples of compounds represented by Formula II above which can be used in my invention have been previously described in the copending application of B. H. Carroll, J. E. Jones and J. Spence, Serial No. 540,054, filed October 12, 1955. (See, in particular, the compounds of Formulas II, III and IV of that application.)

Compounds selected from those of Formula III above wherein $B_1$ represents a 2-benzotriazolyl group can be prepared according to methods previously described in the prior art. See, for example, U.S. Patent 2,713,057, dated July 12, 1955. A somewhat related group of compounds containing a 2-benzotriazolyl group which can be used in my invention have been previously described in U.S. Patent 2,733,165. Such compounds are embraced by Formula II above.

Typical sulfonated derivatives embraced by Formulas II, III, IIIa and IV above are:

(1) A sulfonated triazolostilbene, e.g., of the type shown in U.S. Patent 2,713,057.
(2) 4,4' - di(4",6" - dihydroxy - 2" - s - triazinylamino)-stilbene-2,2'-disulfonic acid.
(3) 4,4' - bis[3 - ( - 3' - sulfoanilino) - 5 - amino - s - triazinylamino]stilbene.
(4) Tinopal-WR, a sulfonated triazinyl stilbene.
(5) Tinopal-2B, a sulfonated triazinyl stilbene.
(6) A sulfonated triazinyl stilbene, e.g., of the type shown in U.S. Patent 2,595,030 or British 595,065.
(7) 4,4' - bis[2 - (4 - sulfoanilino - 4 - $\beta$ - hydroxyethylamino) - 1,3,5 - triazin - 6 - ylamino]stilbene - 2,2' - disulfonic acid.
(8) 4,4' - bis(2,4 - dihydroxy - 1,3,5 - triazin - 6 - ylamino)dibenzyl-2,2'-disulfonic acid.
(9) 4,4' - bis(2 - $\beta$ - hydroxyethylamino - 4 - anilino-1,3,5 - triazin - 6 - ylamino) - 1,4 - distyrylbenzene-2,2'-disulfonic acid.
(10) 5 - methoxy - 2 - (4 - stilbyl) - 1,2,3 - benzotriazole-2'-sulfonic acid.
(11) Calcofluor White-MR, a sulfonated triazinyl stilbene.
(12) p-Quaterphenyl-4',4"'-disulfonic acid.
(13) 3,7 - bis(2 - phenylbenzamido) - 2,8 - disulfodibenzothiophene-5,5-dioxide.
(14) 3,7 - bis(2 - thienylamido) - 2,8 - disulfodibenzothiophene dioxide sodium salt.
(15) 3 - [4 - (4 - methoxy - 3 - sulfobenzamido)phenyl]-7-(4 - methoxy - 3 - sulfobenzamido)dibenzothiophene dioxide sodium salt.
(16) Chrysene-6-sulfonic acid sodium salt.
(17) Pyrene-3-sulfonic acid sodium salt.
(18) Phenanthrene-3-sulfonic acid sodium salt.
(19) 2,3 - dimethylnaphthalene - 1 - sulfonic acid sodium salt.
(20) 4 - [4 - phenoxy - 6 - ($\beta$ - hydroxyethylamino) - s - triazin - 2 - ylamino] - 4' - [4 - chloro - 6 - di($\beta$ - hydroxyethyl)amino - s - triazin - 2 - ylamino]stilbene-2,2'-disulfonic acid.
(21) 2,8 - bis[4 - (4 - sulfoanilino) - 6 - hydroxy - s - triazin-2-ylamino]-carbazole.
(22) 2 - (3 - sulfoanilino) - 6 - hydroxy - 4 - ($\beta$ - hydroxyethyl)amino-s-triazine.
(23) 4,4' - bis(4,6 - di($\beta$ - hydroxyethylamino) - s - triazin-2-yl)benzidine-2,2'-disulfonic acid.
(24) 2-laurylamino-4,6-di(4-sulfoanilino)-s-triazine.
(25) 4,4' - bis{4 - [4' - (N' - 4" - sulfobenzyl - N'-ethyl)aminoanilino] - 6 - hydroxy - s - triazin - 2 - ylamino}stilbene-2,2'-disulfonic acid.

As can be seen above, many of the sulfonated derivatives are employed in the form of their water-soluble salts, such as alkali metal (e.g., sodium, potassium, etc.) salts, or ammonium or amine (e.g., triethylamine, triethanolamine, pyridine, aniline, etc.) salts. By thus using these derivatives, they can be added to the emulsions in substantially neutral aqueous solutions without disturbing the pH of the emulsions.

According to my invention, I incorporate one or more of the complex cyanine dyes selected from those represented by Formula I (or Ia or Ib) above with one or more of the sulfonated derivatives of the type described above in a photographic emulsion. My invention is particularly directed to the ordinarily employed gelatino-silver-halide emulsions. However, my supersensitizing combinations can be employed in silver halide emulsions in which the carrier is other than gelatin, e.g., a resinous substance or cellulose material which has no deteriorating effect on the silver halides.

The complex cyanine dyes and sulfonated derivatives can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing my invention, the complex cyanine dyes are advantageously employed in a concentration approximating their optimum concentration (i.e., the concentration at which the dye gives greatest sensitivity). In general, the sulfonated derivatives employed in my invention have little or no sensitizing action in the emulsions employed.

The optimum concentration of an individual sensitizing dye can be determined in a manner well known to those skilled in the art by measuring the sensitivity of a series of test portions of the same emulsion, each portion containing a different portion of the sensitizing dye. The optimum concentration of the complex-cyanine dyes used in my invention can, of course, be readily determined in the same manner by measuring the sensitivity of a series of test portions of the emulsion, each portion containing a different concentration of the complex cyanine dye to be used in the combination. In determining the optimum concentration for the supersensitizing combination, it is advantageous to employ at first a concentration of the complex cyanine dye less than its optimum concentration, and then gradually increase the concentration of the dye until its optimum concentration is determined.

Ordinarily, the optimum or near optimum concentration of the complex cyanine dyes useful in practicing my invention is of the order of from 0.02 to 0.3 g. per mole of silver halide in the emulsion.

The sulfonated derivatives useful in practicing my invention can advantageously be employed in concentrations on the order of from 0.02 to 10.0 g. per mole of silver halide in the emulsion.

Generally speaking, the ratio of concentration of the complex cyanine dye to the sulfonated derivative can vary rather widely in my combinations, e.g., from 1:100 to 1:1 (by weight) in many instances.

The methods of incorporating sensitizing dyes in emulsions are well known to those skilled in the art, and as mentioned above, the sulfonated derivatives of my invention can be incorporated in the emulsions conveniently in substantially neutral aqueous solution. In practicing my invention, the complex cyanine dyes and sulfonated derivatives can be incorporated in the emulsions separately or together. Frequently, it is convenient to add the complex cyanine dyes and sulfonated derivatives separately in the form of solutions in appropriate solvents. Methanol, ethanol, pyridine, etc., have proven satisfactory as solvents for the complex cyanine dyes which I employ in my invention, although acetone has also been found to be satisfactory in certain cases. If desired, a mixture of solvents, such as methanol and pyridine, can be employed. The complex cyanine dyes and sulfonated derivatives can be added to the emulsions in any given order. The complex cyanine dyes and sulfonated derivatives are advantageously incorporated in the finished, washed emulsions and should be uniformly distributed throughout the emulsions. The following procedure is satisfactory: Stock solutions of the dyes and sulfonated derivatives desired are prepared by dissolving the same in appropriate solvents as described above. Then, to the flowable gelatino-silver-halide emulsion, the desired amounts of the stock solution of one of the dyes (or sulfonated derivatives) is slowly added, while stirring the emulsion. Stirring is continued until the dye is thoroughly incorporated in the emulsion. Then, the desired amount of the stock solution of the sulfonated derivative (or dye, if sulfonated derivative has been added first) is slowly added to the emulsion, while stirring. Stirring is continued until the second ingredient is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art.

The amounts of the complex cyanine dyes and sulfonated derivatives actually incorporated in the emulsion will vary somewhat from case to case, according to the emulsion employed and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly, my invention is directed to any emulsion containing a combination of the aforesaid complex cyanine dyes and sulfonated derivatives whereby a supersensitizing effect is obtained.

My invention is primarily directed to the ordinarily employed gelatino-silver-halide developing-out emulsions, e.g., gelatino-silver-chloride, -chlorobromide, -chloroiodide, -chlorobromoiodide, -bromide and -bromoiodide developing-out emulsions. While the results in the following table were obtained using gelatino-silver-bromoiodide emulsions, excellent results have also been obtained using gelatino-silver-chlorobromide emulsions. Emulsions which form the latent image mostly inside the silver halide grains, such as the emulsions set forth in U.S. Patent 2,456,956, dated December 21, 1948, can also be employed in practicing my invention.

Photographic silver halide emulsions, such as those listed above, containing the supersensitizing combinations of my invention can also contain such addenda as chemical sensitizers, e.g., sulfur sensitizers (e.g., allyl thiocarbamide, thiourea, allylisothiocyanate, cystine, etc.), various gold compounds (e.g. potassium chloroaurate, auric trichloride, etc.) (see U.S. Patents 2,540,085; 2,597,856 and 2,597,915), various palladium compounds, such as palladium chloride (U.S. 2,540,086), potassium chloropalladate (U.S. Patent 2,598,079), etc., or mixtures of such sensitizers; antifoggants, such as ammonium chloroplatinate (U.S. 2,566,245), ammonium chloroplatinite (U.S. 2,566,263), benzotriazole, nitrobenzimidazole, 5-nitroindazole, benzidine, mercaptans, etc. (see Mees—"The Theory of the Photographic Process," Macmillan Pub., 1942, page 460), or mixtures thereof; hardeners, such as formaldehyde (U.S. 1,763,533), chrome alum (U.S. 1,763,533), glyoxal (U.S. 1,870,354), dibromacrolein (Br. 406,750), etc.; color couplers, such as those described in U.S. Patent 2,423,730, Spence and Carroll U.S. Patent 2,640,776, issued June 2, 1953, etc.; or mixtures of such addenda. Dispersing agents for color couplers, such as those set forth in U.S. Patents 2,322,027 and 2,304,940, can also be employed in the above-described emulsions.

The following examples will serve to illustrate further the manner of practicing my invention. To different portions of the same batch of photographic gelatino-silver-bromoiodide emulsion were added (1) a complex cyanine dye of Formulas I, Ia or Ib and (2) a combination of the complex cyanine dye and a sulfonated derivative as described above. Before coating, the emulsions containing the addenda were digested for a short time in a tank maintained at 50–52° C. The different portions of emulsion were then coated on conventional supports and exposed in the usual manner in a spectrograph and Eastman Type Ib Sensitometer through a Wratten 25 Filter, i.e., a filter which transmits substantially no light of wavelengths shorter than about 580 m$\mu$, except in Examples 25 and 41 where a Wratten No. 58 Filter, i.e., a filter which transmits only light of wavelengths lying between 465 and 620 m$\mu$, and Examples 47 and 48 where a Wratten No. 12 Filter, i.e., a filter which transmits substantially no light of wavelengths shorter than 495 m$\mu$, were used. The exposed coatings were then processed for about 3 minutes in a developer having the following composition:

| | G. |
|---|---|
| N-methyl-p-aminophenolsulfate | 2.0 |
| Hydroquinone | 8.0 |
| Sodium sulfite (anhydrous) | 90.0 |
| Sodium carbonate (monohydrate) | 52.5 |
| Potassium bromide | 5.0 |
| Water to make one liter. | |

As mentioned above, no data showing the sensitometric properties of the sulfonated derivatives alone are given, since it has been found that these derivatives have little or no sensitizing action on the emulsions used. Different emulsions were used in some of the examples, although the emulsions of each individual example were obtained from the same batch. In Table A, all of the coatings were obtained from the same batch of emulsion, while in Table B, the coatings of Examples 13–16 were obtained from the same batch of emulsion; the coatings of Examples 17–21 were obtained from the same batch of emulsion; the coatings of Examples 22–24 were obtained from the same batch of emulsion; the coatings of Examples 25–27 were obtained from the same batch of emulsion; the coatings of Examples 28–31 were obtained from the same batch of emulsion; the coatings of Examples 32–36 were obtained from the same batch of emulsions; the coatings of Examples 37–44 were obtained from the same batch of emulsions; the coatings of Examples 45–49 were obtained from the same batch of emulsions, the coatings of Examples 50 and 51 were obtained from the same batch of emulsion and the coatings of Examples 52–56 were obtained from the same batch of emulsion. The purpose of the data in Table A is to show that the useful results of my invention are obtained with different sulfonated derivatives when a single complex cyanine dye is used for comparison, while Table B shows that similar effects are obtained even where the complex cyanine dye is varied in structure. The speed (red, except for Examples 25, 41, 47 and 48), gamma and fog for each of the coatings are given in Tables A and B. The speed figure used is represented by the formula $100(1-\log E)$ where E represents the exposure in meter candles seconds required to provide a density of 0.3. It is to be noted that small differences in speed are quite significant, since a difference of 30 units represents a speed difference of 100% (i.e., $\log^{-1}.30$ is 2).

It is to be noted from the above tables that dyes of Formulas I, Ia, or Ib above can be used in my invention, where R or $R_1$ represents an alkylene group (dimethylene or trimethylene) which is attached to the peri-position of a benzene ring which forms a part of the Z or $Z_1$ heterocyclic nucleus. This alkylene group then defines a hydrogenated pyrrole or pyridine ring, which is fused to the heterocyclic ring defined by Z and $Z_1$. An example of the preparation of such a dye is given below.

TABLE A

| Example | Addenda (g./mol. AgX) | Red Light Exposure | | |
|---|---|---|---|---|
| | | Speed | Gamma | Fog |
| 1 | (a) 2-[(2-benzothiazolyl ethiodide)methylene]-3-β-methoxyethyl-5-[(1-methyl-2(1H)-naphtho[1,2]thiazolylidene)-α-phenylethylidene]-4-thiazolidinone (.08). | 92 | 2.3 | .04 |
| | (b) compound 1 (2.0) | 106 | 2.4 | .05 |
| 2 | (c) dye (a) (.08) plus compound 2 (2.0) | 109 | 2.3 | .04 |
| 3 | (d) dye (a) (.08) plus compound 3 (2.0) | 100 | 2.2 | .04 |
| 4 | (e) dye (a) (.08) plus compound 4 (2.0) | 118 | 2.3 | .04 |
| 5 | (f) dye (a) (.08) plus compound 5 (2.0) | 123 | 2.5 | .04 |
| 6 | (g) dye (a) (.08) plus compound 6 (1.0) | 116 | 2.5 | .04 |
| 7 | (h) dye (a) (.08) plus compound 7 (2.0) | 124 | 2.5 | .04 |
| 8 | (i) dye (a) (.08) plus compound 8 (2.0) | 120 | 2.2 | .04 |
| 9 | (j) dye (a) (.08) plus compound 9 (2.0) | 125 | 2.0 | .04 |
| 10 | (k) dye (a) (.08) plus compound 10 (2.0) | 138 | 2.2 | .04 |
| 11 | (l) dye (a) (.08) plus compound 11 (2.0) | 130 | 2.1 | .04 |
| 12 | (m) dye (a) (.08) plus compound 12 (1.0) | 98 | 2.3 | .04 |

TABLE B

| Example | Addenda (g./mol. AgX) | Sensitizing Data | | |
|---|---|---|---|---|
| | | Speed | Gamma | Fog |
| 13 | (n) 3-ethyl-5-[(3-ethyl-2(3H)-6,7,8,9-tetrahydronaphtho[2,1]-thiazolylidene)-1-phenylethylidene]-2-[(2-naphtho[1,2]-thiazolyl ethobromide)methylene]-4-thiazolidinone (.08) | 102 | 2.3 | .05 |
| | (o) dye (n) (.08) plus compound 10 (.08) | 126 | 2.3 | .05 |
| 14 | (p) 2-[(2-benzothiazolyl ethiodide)methylene]-3-ethyl-5-[(3-ethyl-2(3H)-6,7,8,9-tetrahydronaphtho[2,1]thiazolylidene)-1-phenylethylidene]-4-thiazolidinone (.08) | 105 | 2.5 | .05 |
| | (q) dye (p) (.08) plus compound 10 (.08) | 126 | 2.4 | .05 |
| 15 | (r) 2-[(2-benzothiazolyl-3,4-trimethyleneiodide)methylene]-5-[(3-benzyl-2-(3H)-benzothiazolylidene)ethylidene]-3-ethyl-4-thiazolidinone (.08) | 66 | 2.1 | .04 |
| | (s) dye (r) (.08) plus compound 10 (.08) | 97 | 2.5 | .05 |
| 16 | (t) 2-[(2-benzothiazolyl-3,4-trimethyleneiodide)methylene]-3-benzyl-5-[(3,4-trimethylene-2(3H)-benzothiazolylidene)ethylidene]-4-thiazolidinone | 84 | 2.3 | .05 |
| | (u) dye (t) (.08) plus compound 10 (.08) | 103 | 2.3 | .05 |
| 17 | (v) 2-[(5-chloro-2-benzothiazolyl ethiodide)methylene]-5-[(5-chloro-1,3-diethyl-2(3H)-benzimidazolylidene)ethylidene]-3-ethyl-4-thiazolidinone (.08) | 98 | 2.7 | .05 |
| | (w) dye (v) (.08) plus compound 10 (.08) | 109 | 2.9 | .05 |
| 18 | (x) 2-[(5-chloro-2-benzothiazolyl etho-p-toluenesulfonate)methylene]-3-ethyl-5-[(3-ethyl-2(3H)-benzothiazolylidene)-α-phenylethylidene]-4-thiazolidinone (.08) | 64 | 2.3 | .06 |
| | (y) dye (x) (.08) plus compound 13 (.08) | 120 | 2.5 | .05 |
| 19 | (z) 2-[(2-benzoxazolyl ethiodide)methylene]-3-β-methoxyethyl-5-[(1-methyl-2(1H)-naphtho[1,2]thiazolylidene)-α-phenylethylidene]-4-thiazolidinone (.08) | 84 | 2.5 | .05 |
| | (a') dye (z) (.08) plus compound 13 (.08) | 108 | 2.7 | .05 |
| 20 | (b') 3-β-methoxyethyl-5-[(1-methyl-2(1H)-naphtho[1,2]-thiazolylidene)-α-phenylethylidene]-2-[(2-thiazolinyl methiodide)-4-thiazolidinone (.08) | 103 | 2.8 | .05 |
| | (c') dye (b') (.08) plus compound 13 (.08) | 120 | 2.8 | .05 |
| 21 | (d') 2-[(2-benzoselenazolyl ethiodide)methylene]-3-ethyl-5-[(3-ethyl-2(3H)-benzothiazolylidene)-α-phenylethylidene]-4-thiazolidinone (.08) | 93 | 2.3 | .04 |
| | (e') dye (d') (.08) plus compound 13 (.08) | 135 | 2.8 | .05 |
| 22 | (f') 2-[(2-benzothiazolyl ethiodide)methylene]-5-[(3-benzyl-2(3H)-benzothiazolylidene)ethylidene]-3-ethyl-4-thiazolidinone (.08) | 68 | 2.7 | .04 |
| | (g') dye (f') (.08) plus compound 13 (.08) | 100 | 2.9 | .05 |
| 23 | (h') 2-[(5-chloro-2-benzothiazolyl etho-p-toluenesulfonate)methylene]-3-ethyl-5-[(3-ethyl-2(3H)-benzothiazolylidene)isopropylidene]-4-thiazolidinone (.08) | 68 | 2.7 | .05 |
| | (i') dye (h') (.08) plus compound 13 (.08) | 100 | 2.7 | .05 |
| 24 | (j') 3-ethyl-5-[(3-ethyl-2(3H)-benzothiazolylidene)-α-phenylethylidene]-2-[(2-naphtho[1,2-thiazolyl etho-p-toluenesulfonate)-methylene]-4-thiazolidinone (.08) | 93 | 2.5 | .05 |
| | (k') dye (j') (.08) plus compound 13 (.08) | 139 | 2.7 | .06 |
| 25 | (l') 5-[(3-ethyl-2(3H)-benzoxazolylidene)ethylidene]-2-[(2-β-naphthothiazolyl ethiodide)imino-3-phenyl-4-thiazolidinone (.08) | 29a | 1.7 | .05 |
| | (m') dye (l') (.08) | 63a | 2.2 | .05 |
| 26 | (n') 2-[(2-benzothiazolyl etho-p-toluenesulfonate)methylene]-5-[(5-chloro-1,3-diethyl-2(3H)-benzimidazolylidene)ethylidene]-3-ethyl-4-thiazolidinone (.08) | 110 | 3.1 | .04 |
| | (o') dye (n') (.08) plus compound 13 (.08) | 121 | 3.0 | .05 |
| 27 | (p') 2-[(2-benzoxazolyl ethiodide)methylene]-3-ethyl-5-[(3-ethyl-4-methyl-2(3H)-thiazolylidene)ethylidene]-4-thiazolidinone (.08) | 111 | 3.2 | .05 |
| | (q') dye (p') (.08) | 117 | 3.0 | .05 |
| 28 | (r') 2-[2-(5-chlorobenzothiazolyl etho-p-toluenesulfonate)methylene]-3-ethyl-5-[(3-ethyl-4-methyl-2(3H)-thiazolylidene)ethylidene]-4-thiazolidinone (.08) | 108 | 2.7 | .06 |
| | (s') dye (r') (.08) plus compound 13 (.08) | 129 | 3.0 | .06 |
| 29 | (t') 2-[(2-benzothiazolyl ethiodide)-2-ethoxyallylidene]-5-[(3-ethyl-2(3H)-benzoxazolylidene)ethylidene]-4-thiazolidinone (.08) | 76 | 2.4 | .08 |
| | (u') dye (t') (.08) plus compound 10 (.08) | 108 | 2.8 | .07 |
| 30 | (v') dye (t') (.08) plus compound 13 (.08) | 122 | 2.8 | .09 |
| 31 | (w') 2-[(2-benzoxazolyl ethiodide)methylene]-5-[(6-chloro-1-ethyl-2(1H)-quinolylidene)ethylidene]-3-ethyl-4-thiazolidinone (.08) | 67 | 2.7 | .07 |
| | (x') dye (w') (.08) plus compound 10 (.08) | 97 | 2.9 | .07 |
| 32 | (y') 5-[(1,3-diethyl-2(3H)-benzimidazolylidene)ethylidene]-3-ethyl-2-[(2-naphtho[1,2]thiazolyl etho-p-toluenesulfonate)methylene]-4-thiazolidinone (.08) | 60 | 2.4 | .06 |
| | (z') dye (y') (.08) plus compound 10 (.08) | 93 | 2.4 | .06 |
| 33 | (a'') dye (y') (.08) plus compound 13 (.08) | 108 | 2.8 | .06 |
| 34 | (b'') 2-[(2-benzoxazolyl ethiodide)methylene]-3-ethyl-5-[(1-ethyl-2(1H)-quinolylidene)ethylidene]-1-phenyl-4-imidazolidinone (.08) | 70 | 2.2 | .05 |
| | (c'') dye (b'') (.08) plus compound 10 (.08) | 84 | 2.1 | .05 |

TABLE B—Continued

| Example | Addenda (g./mol. AgX) | Speed | Gamma | Fog |
|---|---|---|---|---|
| 35 | (d″) dye (b″) (.08) plus compound 13 (.08) | 100 | 2.6 | .05 |
|    | (e″) 2-[(2-benzothiazolyl ethiodide)methylene]-3-ethyl-5-[(3-ethyl-2(3H)-benzoxazolylidene)ethylidene]-1-phenyl-4-imidazolidinone (.08). | 93 | 2.8 | .06 |
| 36 | (f″) dye (e″) (.08) plus compound 13 (.08) | 104 | 2.9 | .06 |
|    | (g″) 2-[(2-benzothiazolyl ethiodide)methylene]-5-[(3-ethyl-2(3H)-benzothiazolylidene)ethylidene]-3-methyl-4-thiazolidinone (.08). | 71 | 3.0 | .07 |
| 37 | (h″) dye (g″) (.08) plus compound 10 (.08) | 88 | 2.8 | .05 |
| 38 | (i″) dye (g″) (.08) plus compound 13 (.08) | 103 | 2.6 | .05 |
|    | (j″) 3-ethyl-5-[(1-ethyl-2(1H)-β-naphthothiazolylidene)ethylidene]-2-[(2-β-naphthothiazolyl ethiodide)methylene]-4-thiazolidinone (.08). | 110 | 2.9 | .06 |
| 39 | (k″) dye (j″) (.08) plus compound 10 (.08) | 124 | 2.7 | .06 |
|    | (l″) 2-[(2-benzothiazolyl ethoperchlorate)methylene]-5-[(3-ethyl-2-(3H)-benzoxazolylidene)ethylidene]-1,3-diphenyl-4-imidazolidinone (.08). | 100 | 3.0 | .04 |
| 40 | (m″) dye (l″) (.08) plus compound 13 (.08) | 111 | 2.9 | .06 |
|    | (n″) 2-[(2-benzothiazolyl ethiodide)methylene]-3-ethyl-5-(3-ethyl-2-(3H)-benzothiazolylidene)-4-thiazolidinone (.08). | 98a | 3.1 | .05 |
| 41 | (o″) dye (n″) (.08) plus compound 13 (.08) | 115a | 3.0 | .05 |
|    | (p″) 3-ethyl-5-[(3-ethyl-2(3H)-benzothiazolylidene)ethylidene]-2-[(2-naphtho[1,2]thiazolyl etho-p-toluenesulfonate)methylene]-4-thiazolidinone (.08). | 75 | 3.0 | .06 |
| 42 | (q″) dye (p″) (.08) plus compound 10 (.08) | 107 | 3.3 | .08 |
| 43 | (r″) dye (p″) (.08) plus compound 13 (.08) | 97 | 3.3 | .06 |
|    | (s″) 2-[(2-benzothiazolyl benzobromide)methylene]-3-ethyl-5-[(3-ethyl-2-(3H)-benzothiazolylidene)ethylidene]-4-thiazolidinone (.08). | 91 | 2.5 | .06 |
| 44 | (t″) dye (s″) (.08) plus compound 13 (.08) | 110 | 2.5 | .06 |
|    | (u″) 2-[(2-benzoselenazolyl ethiodide)methylene]-4-[(3-ethyl-2(3H)-benzoxazolylidene)ethylidene]-3-methyl-5-thiazolidinone (.08). | 71 | 3.0 | .07 |
| 45 | (v″) dye (u″) (.08) plus compound 10 (.08) | 97 | 3.3 | .05 |
| 46 | (w″) dye (u″) (.08) plus compound 13 (.08) | 98 | 3.2 | .07 |
|    | (x″) 2-[(2-thiazolinyl methiodide)methylene]-4-[(3-ethyl-2(3H)-benzoxazolylidene)ethylidene]-3-methyl-5-thiazolidinone (.08). | 107b | 3.4 | .06 |
| 47 | (y″) dye (x″) (.08) plus compound 13 (.08) | 121b | 3.2 | .06 |
|    | (z″) 2-[(2-thiazolinyl methiodide)methylene]-5-[(3-ethyl-2(3H)-benzoxazolylidene)ethylidene]-3-methyl-4-thiazolidinone (.08). | 87b | 3.2 | .06 |
| 48 | (a‴) dye (z″) (.08) plus compound 13 (.08) | 112b | 2.9 | .07 |
|    | (b‴) 2-[(4,5-diphenylthiazolyl ethiodide)methylene]-3-ethyl-5-[(3-ethyl-2(3H)-6,7,8,9-tetrahydronaphtho[2,1]thiazolylidene)-1-phenylethylidene]-4-thiazolidinone (.08). | 110 | 2.7 | .06 |
| 49 | (c‴) dye (b‴) (.08) plus compound 10 (.08) | 121 | 2.7 | .06 |
|    | (d‴) 2-[(2-benzothiazolyl ethiodide)imino]-5-[(3-ethyl-2(3H)-benzothiazolylidene)ethylidene]-3-phenyl-4-thiazolidinone (.08). | 20 | 2.6 | .06 |
| 50 | (e‴) dye (d‴) (.08) plus compound 10 (.08) | 50 | 2.6 | .07 |
| 51 | (f‴) dye (d‴) (.08) plus compound 13 (.08) | 55 | 2.8 | .06 |
|    | (g‴) 3-ethyl-2-[(2-benzoxazolyl ethiodide)methylene]-5-[(1-ethyl-2(1H)-quinolylidene)ethylidene]-4-thiazolidinone (.08). | 72 | 3.2 | .06 |
| 52 | (h‴) dye (g‴) (.08) plus compound 13 (.08) | 94 | 3.1 | .06 |
|    | (i‴) 3-ethyl-2-[(5-phenyl-4-p-xylyl-2-thiazolyl methiodide)-methylene]-5-[(3-methyl-5-phenyl-4-p-xylyl-2(3H)-thiazolylidene)ethylidene]-4-thiazolidinone (.08). | 78 | 2.6 | .05 |
| 53 | (j‴) dye (i‴) (.08) plus compound 10 (.08) | 89 | 3.0 | .05 |
|    | (k‴) 2-[(2-benzoselenazolinyl ethiodide)methylene]-4-[(3-ethyl-2(3H)-benzoselenazolylidene)ethylidene]-3-methyl-5-thiazolidinone (.08). | 57 | 2.6 | .06 |
| 54 | (l‴) dye (k‴) (.08) plus compound 13 (.08) | 80 | 3.2 | .05 |
|    | (m‴) 2-[(2-benzoselenazolinyl ethiodide)methylene]-5-[(3-ethyl-2(3H)-benzoselenazolylidene)ethylidene]-3-ethyl-4-thiazolidinone (.08). | 69 | 3.3 | .04 |
| 55 | (n‴) dye (m‴) (.08) plus compound 13 (.08) | 88 | 3.0 | .05 |
|    | (o‴) 2-[(4-p-anisyl-5-phenyl-2-thiazolyl ethiodide)methylene]-5-[(3-ethyl-2(3H)-benzoxazolylidene)ethylidene]-3-ethyl-4-thiazolidinone (.08). | 46 | 3.0 | .06 |
| 56 | (p‴) dye (o‴) (.08) plus compound 13 (.08) | 60 | 3.5 | .07 | a = green speed.
b = minus blue speed.

Example A.—2-[(2-benzothiazolyl ethiodide)methylene]-3-β-methoxyethyl-5-[(1-methyl-2(1H) - naptho[1,2]-thiazolylidene) - α - phenylethylidene]-4-thiazolidinone

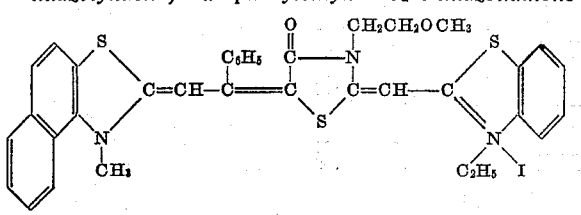

A mixture of 4.9 g. of 3-β-methoxyethyl-5-[(1-methyl-2(1H) - naphtho[1,2]thiazolylidene) - α - phenylethylidene]rhodanine and 3.7 g. of methyl p-toluenesulfonate was heated at the temperature of the steam bath for 4 hours. The resulting product was washed with acetone, and then it was condensed with 3.05 g. of 3-ethyl-2-methylbenzothiazolium iodide in 25 ml. of dry pyridine containing 1.0 g. of triethylamine by heating the reaction mixture at the refluxing temperature for 15 minutes. After chilling, the solids were collected on a filter and washed with methyl alcohol. The yield of dye after two recrystallizations from methyl alcohol was 7%. The dark green crystals melted at 224–226° C. with decomposition.

Example B.—3-ethyl-5-[(3-ethyl - 2(3H)-6,7,8,9 - tetrahydronaphtho[2,1]thiazolylidene) - 1 - phenylethylidene] - 2 - [(2-naphtho[1,2] thiazolyl ethobromide)methylene]-4-thiazolidinone A mixture of 0.48 g. of 3-ethyl-5-[(3-ethyl-2(3H)-6,7,8,9-tetrahydronaphtho[2,1]thiazolylidene) - 1-phenylethylidene]-rhodanine (PB Report 74175, page 00401) and 0.37 g. of methyl p-toluenesulfonate was fused over a free flame and then heated in an oil bath at 115–120° C. for 90 minutes. The resulting crude product was condensed with 0.80 g. of 1-ethyl-2-methylnaphtho[1,2]-thiazolium p-toluenesulfonate in 15 ml. of dry pyridine by heating the reaction mixture at the refluxing temperature for 15 minutes. An aqueous solution of 2 g. of sodium bromide in 25 ml. of water was added to the hot reaction mixture. After chilling, the dye was collected on a filter and washed first with ether and then with water. The yield of dye after two recrystallizations from methyl alcohol was 77%. The brownish-green crystals melted at 219–220° C. with decomposition.

*Example C.*—*2 - [(2 - benzothiazolyl-3,4-trimethylene iodide)-methylene] - 5 - [(3 - benzyl - 2(3H)-benzothiazolylidene)-ethylidene]-3-ethyl - 4 - thiazolidinone*

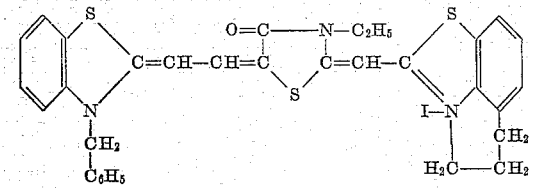

A mixture of 4.1 g. of 5-[(3-benzyl-2(3H)-benzothiazolylidene)ethylidene]-3-ethylrhodanine and 3.7 g. of methyl p-toluenesulfonate was fused over a free flame and then heated at the temperature of the steam bath for two hours. The resulting product was washed with absolute ether, and then it was condensed with 3.2 g. of 2-methyl-3,4-trimethylenebenzothiazolium iodide in 25 ml. of dry pyridine containing 1.0 g. of triethylamine by heating the reaction mixture at the refluxing temperature for 10 minutes. After chilling the dye was collected on a filter and washed with methyl alcohol. The yield of dye after two recrystallizations from methyl alcohol was 16%. The dark green crystals melted at 288–290° C. with decomposition.

*Example D.*—*2 - [(5-chloro-2-benzothiazolyl ethiodide) methylene] - 5 - [(5-chloro-1,3-diethyl-2(3H)-benzimidazolylidene)-ethylidene] - 3-ethyl-4-thiazolidinone*

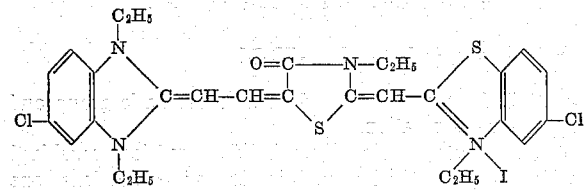

A mixture of 1.0 g. of 5-[(5-chloro-1,3-diethyl-2(3H)-benzimidazolylidene)ethylidene]-3-ethylrhodanine and 3 ml. of methyl p-toluenesulfonate was heated over a free flame for about 3 minutes. The resulting product was washed with absolute diethyl ether, and then it was condensed with 1.0 g. of 5-chloro-3-ethyl-2-methylbenzothiazolium iodide in 15 ml. of absolute ethyl alcohol containing 3.5 ml. of triethylamine by heating the reaction mixture at the refluxing temperature for about one minute. After chilling, the dye was collected on a filter and washed first with acetone and then water. The yield of dye after two recrystallizations from methyl alcohol was 30%. The green crystals melted at 321–322° C. with decomposition.

*Example E.*—*5 - [(3 - ethyl-2(3H)-benzoxazolylidene) ethylidene] - 2 - [(2 - β-naphthothiazolyl ethiodide) imino]-3-phenyl-4-thiazolidinone*

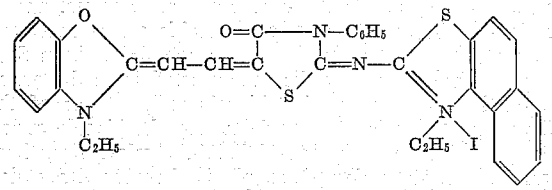

A mixture of 2.65 g. of 2 - [(2-β-naphthothiazolyl ethiodide)imino] - 3 - phenyl-4-thiazolidinone (prepared from 1-ethyl-2-imino-β - naphthothiazoline, phenyl isothiocyanate and chloroacetic acid) and 2.17 g. of 2-β-acetanilidovinyl-3-ethylbenzoxazolium iodide in 25 ml. of absolute ethyl alcohol containing 1.0 ml. of triethylamine was heated at the refluxing temperature for 25 minutes.

After chilling, the dye was collected on a filter and washed first with water, then acetone and finally methyl alcohol. The dye was dissolved in hot cresol, the solution was filtered and methyl alcohol was added to the filtrate. After chilling, the dye was collected on a filter and washed with methyl alcohol. After another such treatment, the yield of dye was 40%. The dull purplish needles with a green reflex melted at 265–266° C. with decomposition. (Cf. U.S. Patent 2,535,982.)

*Example F.*—*2-[3-(2-benzothiazolyl ethiodide)-2-ethoxyallylidene] - 3 - ethyl - 5 - [(3 - ethyl - 2(3H) - benzoxazolylidene-ethylidene]-4-thiazolidinone*

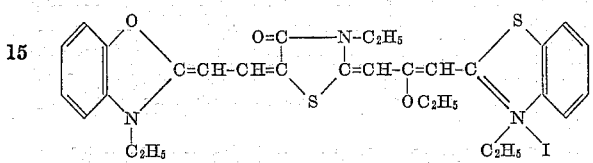

A mixture of 1.11 g. of 3-ethyl-5-[(3-ethyl-2(3H)-benzoxazolylidene)ethylidene)rhodanine and 1.0 g. of methyl p-toluenesulfonate was fused over a free flame and then heated at the temperature of the steam bath for two hours. The crude product was condensed with 1.25 g. of 2-(2-ethoxypropenyl)-3-ethylbenzothiazolium iodide in 20 ml. of absolute ethyl alcohol containing 0.7 ml. of triethylamine by heating the reaction mixture at the refluxing temperature for 30 minutes. After chilling, the dye was collected on a filter and washed with methyl alcohol. The yield of dye after two recrystallizations from methyl alcohol was 47%. The dark green crystals melted at 207–208° C. with decomposition.

In exactly the manner shown above, other dyes useful in my invention can be prepared. The following table gives the melting points of a number of dyes related to those of Examples A–F.

MELTING POINTS FOR RELATED DYES

| Dye: | M.P., ° C. (with decomposition) |
|---|---|
| p | 291–292 |
| t | 284–286 |
| x | 323–325 |
| z | 227–229 |
| b' | 256–258 |
| d' | 297–299 |
| f' | 248–250 |
| h' | 292–294 |
| j' | 271–273 |
| n' | 286–287 |
| p' | 293–295 |
| r' | 282–284 |
| w' | 282–284 |
| y' | 284–285 |
| b'' | 293–295 |
| e'' | 291–293 |
| g'' | 310–312 |
| j'' | 247–249 |
| l'' | 181–184 |
| n'' | 274–276 |
| p'' | 256–258 |
| s'' | 246–248 |
| u'' | 296–297 |
| x'' | 298–299 |
| z'' | 304–306 |
| b''' | 262–263 |
| d''' | 258–259 |
| g''' | 298–300 |
| i''' | 237–239 |
| k''' | 280–281 |
| m''' | 279–280 |
| o''' | 287–288 |

The accompanying drawing illustrates the supersensitizing effect obtained with three of my new combinations in gelatino-silver-bromiodide emulsions. Each figure of the drawing is a diagrammatic reproduction of two spectograms. In each figure, the sensitivity of the emulsion containing the complex cyanine dye of Formula I above is represented by the solid lower curve. The upper curve (dotted line) represents the sensitivity conferred on the emulsion by the combination of the complex cyanine dye of Formula I with one of the sulfonated compounds of my invention. No curve illustrating the effect of the sulfonated compound alone is shown, inasmuch as it has been found that these sulfonated compounds have little or no measurable effect on the sensitivity of the emulsions.

In Figure 1, curve A represents the sensitivity of an ordinary gelatino-silver-bromiodide emulsion sensitized with 2 - [(2 - benzothiazolyl ethiodide)methylene] - 3- β - methoxyethyl - 5 - [(1 - methyl - 2(1H) - naphtho [1,2]thiazolylidene) - α - phenylethylidene] - 4 - thiazolidinone, while curve B represents the sensitivity of the same emulsions sensitized with 2-[(2-benzothiazolyl ethiodide)methylene] - 3 - β - methoxyethyl - 5 - [(1-methyl - 2(1H) - naphtho[1,2]-thiazolylidene) - α - phenylethylidene]-4-thiazolidinone and 5-methoxy-2-(4-stilbyl)-1,2,3-benzotriazole-2'-sulfonic acid. The sensitometric measurements for these emulsions are given in Example 10 of the above table.

In Figure 2, curve C represents the sensitivity of an ordinary gelatino-silver-bromiodide emulsion sensitized with 2-[(5-chloro-2-benzothiazolyl etho-p-(toluenesulfonate)methylene] - 3 - ethyl - 5 - [(3 - ethyl - 2(3H)-benzothiazolylidene) - α - phenylethylidene] - 4 - thiazolidinone, while curve D represents the sensitivity of the same emulsion sensitized with 2-[(5-chloro-2-benzothiazolyl etho - p - toluenesulfonate)methylene] - 3- ethyl - 5 - [(3 - ethyl - 2(3H) - benzothiazolylidene)- α-phenylethylidene]-4-thiazolidinone and 3,7-bis(2-phenylbenzamido) - 2,8 - disulfodibenzothiophene - 5,5 - dioxide. The sensitometric measurements for these emulsions are given in Example 18 of the above table.

In Figure 3, curve E represents the sensitivity of an ordinary gelatino-silver-bromiodide emulsion sensitized with 3 - ethyl - 5 - [(3 - ethyl - 2(3H) - benzothiazolylidene)ethylidene] - 2 - [(2 - naphtho[1,2]thiazolyl etho-p-toluenesulfonate)methylene] - 4 - thiazolidinone, and curve F represents the sensitivity of the same emulsion sensitized with 3-ethyl-5[(3 - ethyl - 2(3H) - benzothiazolylidene)ethylidene] - 2 - [(2 - naphtho[1,2]thiazolyl etho - p - toluenesulfonate)methylene] - 4 - thiazolidinone and 5-methoxy-2-(4-stilbyl)1,2,3-benzotriazole-2'-sulfonic acid.

The term "sulfo" is used in the foregoing specification and in the following claims to mean the free acid group, as well as salts of this free acid group, including alkali metal salts (e.g., sodium, potassium, etc.), ammonium salts, amine addition salts (e.g., triethylamine, ethanolamine, triethanolamine, pyridine, picolines, etc.). As mentioned above, one advantage of adding the sulfonated derivatives in the form of their salt solutions is that the pH of the solution is not disturbed. However, when using small quantities of sulfonated derivatives, the free acids can also be used to advantage.

What I claim as my invention and desire secured by Letters Patent of the United States is:

1. A photographic silver halide emulsion sensitized with a supersensitizing combination of (a) at least one complex cyanine dye selected from the class represented by the following general formula:

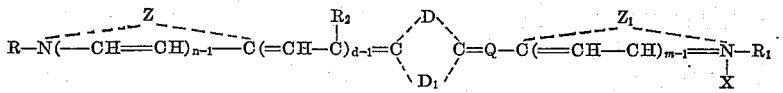

wherein R and $R_1$ each represents an alkyl group, $R_2$ represents a member selected from the group consisting of a hydrogen atom, an alkyl group, and an aryl group, Q represents a member selected from the group consisting of a methine group and a nitrogen atom, X represents an acid radical, $n$, $m$ and $d$ each represents a positive integer of from 1 to 2, D and $D_1$ together represent the non-metallic atoms necessary to complete a heterocyclic nucleus selected from the group consisting of those of the 4-thiazolidinone series, those of the 5-thiazolidinone series, and those of the 4-imidazolidinone series, and Z and $Z_1$ each represents the non-metallic atoms necessary to complete a heterocyclic nucleus containing from 5 to 6 atoms in the heterocyclic ring selected from the group consisting of those of the thiazole series, those of the benzothiazole series, those of the naphthothiazole series, those of the thianaphtheno-7',6',4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the benzimidazole series, those of the 3,3-dialkylindolenine series, those of the 2-pyridine series, and those of the 4-pyridine series, and (b) at least one water-soluble compound selected from the class represented by the following general formula:

$$R_3\text{—}SO_3M$$

wherein $R_3$ represents a polynuclear aromatic group and M represents a cation.

2. A photographic silver halide emulsion sensitized with a supersensitizing combination of (a) at least one complex cyanine dye selected from the class represented by the following general formula:

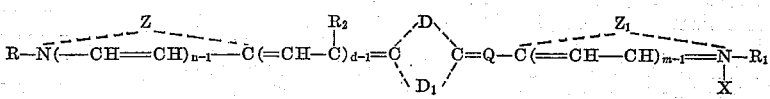

wherein R and $R_1$ each represents an alkyl group, $R_2$ represents a member selected from the group consisting of a hydrogen atom, an alkyl group, and an aryl group, Q represents a member selected from the group consisting of a methine group and a nitrogen atom, X represents an acid radical, $n$, $m$ and $d$ each represents a positive integer of from 1 to 2, D and $D_1$ together represent the non-metallic atoms necessary to complete a heterocyclic nucleus selected from the group consisting of those of the 4-thiazolidinone series, those of the 5-thiazolidinone series, and those of the 4-imidazolidinone series, and Z and $Z_1$ each represents the non-metallic atoms necessary to complete a heterocyclic nucleus containing from 5 to 6 atoms in the heterocyclic ring selected from the group consisting of those of the thiazole series, those of the benzothiazole series, those of the naphthothiazole series, those of the thianaphtheno-7',6',4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the benzimidazole series, those of the 3,3-dialkylindolenine series, those of the 2-pyridine series, and those of the 4-pyridine series, and (b) at least one water-soluble compound selected from the class represented by the following general formula:

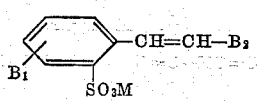

wherein $B_1$ represents a member selected from the group consisting of a 2-benzotriazolyl group and a 1,3,5-triazin-6-ylamino group, $B_2$ represents an aromatic group, and M represents a cation.

3. A photographic silver halide emulsion sensitized with a supersensitizing combination of (a) at least one complex cyanine dye selected from the class represented by the following general formula:

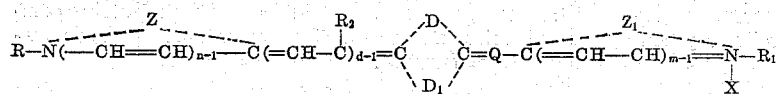

wherein R and $R_1$ each represents an alkyl group, $R_2$ represents a member selected from the group consisting of a hydrogen atom, an alkyl group, and an aryl group, Q represents a member selected from the group consisting of a methine group and a nitrogen atom, X represents an acid radical, n, m and d each represents a positive integer of from 1 to 2, D and $D_1$ together represent the non-metallic atoms necessary to complete a heterocyclic nucleus selected from the group consisting of those of the 4-thiazolidinone series, those of the 5-thiazolidinone series, and those of the 4-imidazolidinone series, and Z and $Z_1$ each represents the non-metallic atoms necessary to complete a heterocyclic nucleus containing from 5 to 6 atoms in the heterocyclic ring selected from the group consisting of those of the thiazole series, those of the benzothiazole series, those of the naphthothiazole series, those of the thianaphtheno-7',6',4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the benzimidazole series, those of the 3,3-dialkylindolenine series, those of the 2-pyridine series, and those of the 4-pyridine series, and (b) at least one water-soluble compound selected from the class represented by the following general formula:

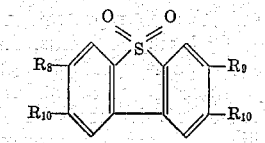

wherein $R_8$ represents a member selected from the group consisting of an acylamido group and a sulfo group, $R_9$ represents a member selected from the group consisting of an acylamido group and a sulfoaryl group and $R_{10}$ represents a member selected from the group consisting of a hydrogen atom and a sulfo group, said compound (b) containing at least one sulfo group.

4. A photographic silver halide developing-out emulsion sensitized with a supersensitizing combination of (a) at least one complex cyanine dye selected from the class represented by the following general formula:

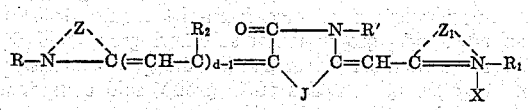

wherein R, $R_1$ and R' each represents an alkyl group, $R_2$ represents a member selected from the group consisting of a hydrogen atom, an alkyl group and an aryl group, J represents a member selected from the group consisting of a sulfur atom and a

group wherein R'' represents a member selected from the group consisting of an alkyl group and an aryl group, X represents an acid radical, d represents a positive integer of from 1 to 2, and Z and $Z_1$ each represents the non-metallic atoms necessary to complete a heterocyclic nucleus selected from the group consisting of those of the thiazole series, those of the benzothiazole series, those of the naphthothiazole series, those of the thiazoline series, those of the benzoxazole series, those of the benzoselenazole series, those of the benzimidazole series, and those of the 2-quinoline series, and (b) at least one water-soluble compound selected from the class represented by the following general formula:

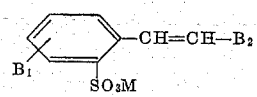

wherein $B_1$ represents a member selected from the group consisting of a 2-benzotriazolyl group and a 1,3,5-triazin-6-ylamino group, $B_2$ represents an aromatic group, and M represents a cation.

5. A photographic silver halide developing-out emulsion sensitized with a supersensitizing combination of (a) at least one complex cyanine dye selected from the class represented by the following general formula:

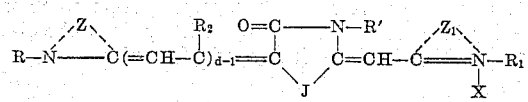

wherein R, $R_1$ and R' each represents an alkyl group, $R_2$ represents a member selected from the group consisting of a hydrogen atom, an alkyl group and an aryl group, J represents a member selected from the group consisting of a sulfur atom and a

group wherein R'' represents a member selected from the group consisting of an alkyl group and an aryl group, X represents an acid radical, d represents a positive integer of from 1 to 2, and Z and $Z_1$ each represents the non-metallic atoms necessary to complete a heterocyclic nucleus selected from the group consisting of those of the thiazole series, those of the benzothiazole series, those of the naphthothiazole series, those of the thiazoline series, those of the benzoxazole series, those of the benzoselenazole series, those of the benzimidazole series, and those of the 2-quinoline series, and (b) at least one water-soluble compound selected from the class represented by the following general formula:

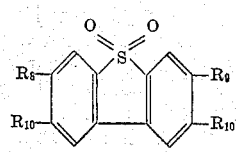

wherein $R_8$ represents a member selected from the group consisting of an acylamido group and a sulfo group, $R_9$ represents a member selected from the group consisting of an acylamido group and a sulfoaryl group and $R_{10}$ represents a member selected from the group consisting of a hydrogen atom and a sulfo group, said compound (b) containing at least one sulfo group.

6. A photographic gelatino-silver-halide developing-out emulsion sensitized with a supersensitizing combination of (a) a complex cyanine dye selected from the class represented by the following general formula:

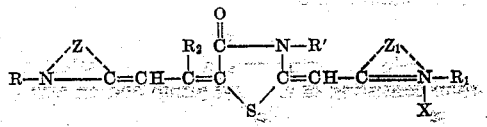

wherein R, R₁ and R' each represents an alkyl group containing from 1 to 4 carbon atoms, R₂ represents a member selected from the group consisting of a hydrogen atom and an aryl group, X represents an acid radical, Z represents the non-metallic atoms necessary to complete a heterocyclic nucleus selected from those of the naphthothiazole series and Z₁ represents the non-metallic atoms necessary to complete a heterocyclic nucleus of the benzothiazole series, and (b) a water soluble compound selected from the class represented by the following general formula:

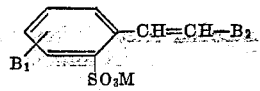

wherein B₁ represents a member selected from the group consisting of a 2-benzotriazolyl group and a 1,3,5-triazin-6-ylamino group, B₂ represents an aromatic group, and M represents a cation.

7. A photographic gelatino-silver-halide developing-out emulsion sensitized with a supersensitizing combination of 2-[(2-benzothiazolyl ethiodide)methylene]-3-β-methoxyethyl-5 - [(1 - methyl - 2(1H) - naphtho[1,2]thiazolylidene)-α-phenylethylidene]-4-thiazolidinone and 5-methoxy-2-(4-stilbyl)-1,2,3-benzotriazole-2'-sulfonic acid sodium salt.

8. A photographic gelatino-silver-halide developing-out emulsion sensitized with a supersensitizing combination of (a) a complex cyanine dye selected from the class represented by the following general formula:

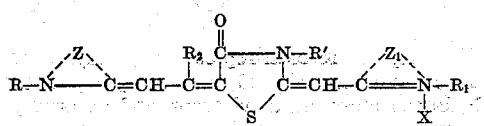

wherein R, R₁, and R' each represents an alkyl group containing from 1 to 4 carbon atoms, R₂ represents a member selected from the group consisting of a hydrogen atom and an aryl group, X represents an acid radical, and Z and Z₁ each represents the non-metallic atoms necessary to complete a heterocyclic nucleus selected from those of the benzothiazole series, and (b) a water-soluble compound selected from the class represented by the following general formula:

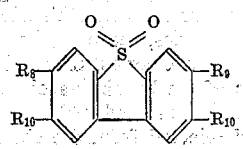

wherein R₈ represents a member selected from the group consisting of an acylamido group and a sulfo group, R₉ represents a member selected from the group consisting of an acylamido group and a sulfoaryl group and R₁₀ represents a member selected from the group consisting of a hydrogen atom and a sulfo group, said compound (b) containing at least one sulfo group.

9. A photographic gelatino-silver-halide developing-out emulsion sensitized with a supersensitizing combination of 2-[(5-chloro-2-benzothiazolyl etho-p-toluenesulfonate)methylene]-3-ethyl-5-[(3-ethyl-2(3H) - benzothiazolylidene)-α - phenylethylidene] - 4 - thiazolidinone and 3,7 - bis(2'- phenylbenzamido) - 2,8 - disulfodibenzothiophene-5,5-dioxide sodium salt.

10. A photographic gelatino-silver-halide developing-out emulsion sensitized with a supersensitizing combination of (a) a complex cyanine dye selected from the class represented by the following general formula:

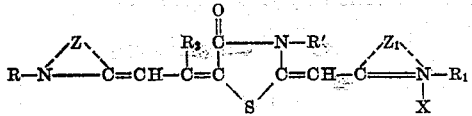

wherein R, R₁ and R' each represents an alkyl group containing from 1 to 4 carbon atoms, R₂ represents a member selected from the group consisting of a hydrogen atom and an aryl group, X represents an acid radical, Z represents the non-metallic atoms necessary to complete a heterocyclic nucleus selected from those of the benzothiazole series and Z₁ represents the non-metallic atoms necessary to complete a heterocyclic nucleus of the benzoselenazole series, and (b) a water-soluble compound selected from the class represented by the following general formula:

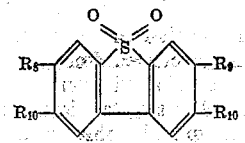

wherein R₈ represents a member selected from the group consisting of an acylamido group and a sulfo group, R₉ represents a member selected from the group consisting of an acylamido group and a sulfoaryl group and R₁₀ represents a member selected from the group consisting of a hydrogen atom and a sulfo group, said compound (b) containing at least one sulfo group.

11. A photographic gelatino-silver-halide developing-out emulsion sensitized with a supersensitizing combination of 2-[(2-benzoselenazolyl ethiodide)methylene]-3-ethyl-5-[(3-ethyl - 2(3H)-benzothiazolylidene)-α-phenylethylidene]-4-thiazolidinone and 3,7-bis(2-phenylbenzamido)-2,8-disulfodibenzothiophene-5,5-dioxide sodium salt.

12. A photographic gelatino-silver-halide developing-out emulsion sensitized with a supersensitizing combination of (a) a complex cyanine dye selected from the class represented by the following general formula:

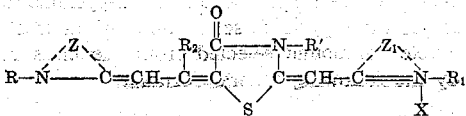

wherein R, R₁ and R' each represents an alkyl group containing from 1 to 4 carbon atoms, R₂ represents a member selected from the group consisting of a hydrogen atom and an aryl group, X represents an acid radical, Z represents the non-metallic atoms necessary to complete a heterocyclic nucleus selected from those of the benzothiazole series and Z₁ represents the non-metallic atoms necessary to complete a heterocyclic nucleus of the naphthothiazole series, and (b) a water-soluble compound selected from the class represented by the following general formula:

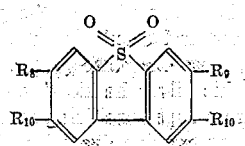

wherein R₈ represents a member selected from the group consisting of an acylamido group and a sulfo group, R₉ represents a member selected from the group consisting of an acylamido group and a sulfoaryl group and R₁₀ represents a member selected from the group consisting of a hydrogen atom and a sulfo group, said compound (b) containing at least one sulfo group.

13. A photographic gelatino-silver-halide developing-out emulsion sensitized with a supersensitizing combination of 3-ethyl-5-[(3-ethyl-2(3H)-benzothiazolylidene)-

α-phenylethylidene]-2-[(2-naphtho[1,2]thiazolyl etho-p-toluenesulfonate)methylene]-4-thiazolidinone and 3,7-bis(2 - phenylbenzamido) - 2,8 - disulfodibenzothiophene-5,5-dioxide sodium salt.

14. A photographic gelatino-silver-halide developing-out emulsion sensitized with a supersensitizing combination of (a) a complex cyanine dye selected from the class represented by the following general formula:

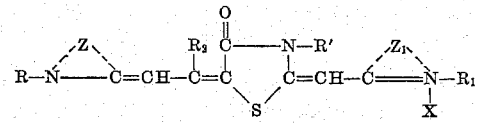

wherein R, $R_1$ and R' each represents an alkyl group containing from 1 to 4 carbon atoms, $R_2$ represents a member selected from the group consisting of a hydrogen atom and an aryl group, X represents an acid radical, Z represents the non-metallic atoms necessary to complete a heterocyclic nucleus selected from those of the benzimidazole series and $Z_1$ represents the non-metallic atoms necessary to complete a heterocyclic nucleus of the naphthothiazole series, and (b) a water-soluble compound selected from the class represented by the following general formula:

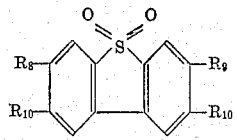

wherein $R_8$ represents a member selected from the group consisting of an acylamido group and a sulfo group, $R_9$ represents a member selected from the group consisting of an acylamido group and a sulfoaryl group and $R_{10}$ represents a member selected from the group consisting of a hydrogen atom and a sulfo group, said compound (b) containing at least one sulfo group.

15. A photographic gelatino-silver-halide developing-out emulsion sensitized with a supersensitizing combination of 5-[(1,3-diethyl-2(3H)-benzimidazolylidene)ethylidene]-3-ethyl-2-[(2-naphtho[1,2]thiazolyl etho-p-toluenesulfonate)methylene]-4-thiazolidinone and 3,7-bis(2-phenylbenzamido) - 2,8 - disulfodibenzothiophene - 5,5-dioxide sodium salt.

16. A photographic silver bromiodide emulsion sensitized with a supersensitizing combination of (a) at least one complex cyanine dye selected from the class represented by the following general formula:

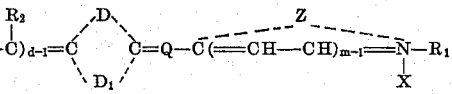

wherein R and $R_1$ each represents an alkyl group, $R_2$ represents a member selected from the group consisting of a hydrogen atom, an alkyl group, and an aryl group, Q represents a member selected from the group consisting of a methine group and a nitrogen atom, X represents an acid radical, n, m and d each represents a positive integer of from 1 to 2, D and $D_1$ together represent the non-metallic atoms necessary to complete a heterocyclic nucleus selected from the group consisting of those of the 4-thiazolidinone series, those of the 5-thiazolidinone series, and those of the 4-imidazolidinone series, and Z and $Z_1$ each represents the non-metallic atoms necessary to complete a heterocyclic nucleus containing from 5 to 6 atoms in the heterocyclic ring, and (b) at least one water-soluble compound selected from the class represented by the following general formula:

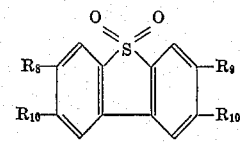

wherein $R_8$ represents a member selected from the group consisting of an acylamido group and a sulfo group, $R_9$ represents a member selected from the group consisting of an acylamido group and a sulfoaryl group and $R_{10}$ represents a member selected from the group consisting of a hydrogen atom and a sulfo group, said compound (b) containing at least one sulfo group.

References Cited in the file of this patent
UNITED STATES PATENTS

| | | |
|---|---|---|
| 2,186,717 | Eggert et al. | Jan. 9, 1940 |
| 2,304,962 | Sheppard et al. | Dec. 15, 1942 |
| 2,420,631 | Taylor | May 13, 1947 |
| 3,440,119 | Riester et al. | Apr. 20, 1948 |
| 2,694,636 | Keller | Nov. 16, 1954 |
| 2,718,466 | Wolfson | Sept. 20, 1955 |

UNITED STATES PATENT OFFICE
CERTIFICATE OF CORRECTION

Patent No. 2,947,630            August 2, 1960

Jean E. Jones

It is hereby certified that error appears in the printed specification of the above numbered patent requiring correction and that the said Letters Patent should read as corrected below.

Column 1, lines 58 to 62, the right-hand portion of the formula should read as shown below instead of as in the patent:

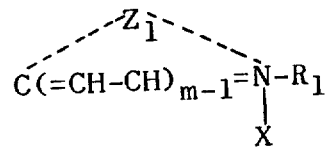

column 3, line 25, for "polycarbocyclic" read -- polynuclear --; column 5, line 4, for "an" read -- can --; column 16, line 24, for "grop" read -- group --.

Signed and sealed this 18th day of April 1961.

(SEAL)
Attest:
ERNEST W. SWIDER
Attesting Officer

DAVID L. LADD
Commissioner of Patents